United States Patent
Welle et al.

(10) Patent No.: US 11,015,969 B2
(45) Date of Patent: May 25, 2021

(54) FILL LEVEL RADAR DEVICE HAVING CONTROLLED TRANSMISSION POWER

(71) Applicant: VEGA GRIESHABER KG, Wolfach (DE)

(72) Inventors: Roland Welle, Hausach (DE); Karl Griessbaum, Muehlenbach (DE)

(73) Assignee: VEGA GRIESHABER KG, Wolfach (DE)

( * ) Notice: Subject to any disclaimer, the term of this patent is extended or adjusted under 35 U.S.C. 154(b) by 187 days.

(21) Appl. No.: 16/014,680

(22) Filed: Jun. 21, 2018

(65) Prior Publication Data

US 2018/0372530 A1 Dec. 27, 2018

(30) Foreign Application Priority Data

Jun. 21, 2017 (DE) ..................... 10 2017 210 381.7
Jun. 21, 2017 (DE) ..................... 10 2017 210 382.5
Jun. 21, 2017 (DE) ..................... 10 2017 210 383.3
Jun. 21, 2017 (DE) ..................... 10 2017 210 402.3

(Continued)

(51) Int. Cl.
*G01F 23/284* (2006.01)
*G01S 7/40* (2006.01)
(Continued)

(52) U.S. Cl.
CPC .......... *G01F 23/284* (2013.01); *G01S 7/4008* (2013.01); *G01S 13/88* (2013.01);
(Continued)

(58) Field of Classification Search
CPC ............... G01F 23/284; G01F 23/0069; G01F 25/0061; G01F 25/0076; G01F 23/0061; G01F 23/288; G01S 13/88; G01S 13/343; G01S 7/35; G01S 13/347; G01S 7/003; G01S 13/08; G01S 13/34;
(Continued)

(56) References Cited

U.S. PATENT DOCUMENTS 4,044,354 A 8/1977 Bosher et al.
4,210,023 A 7/1980 Sakamoto et al.
(Continued)

FOREIGN PATENT DOCUMENTS

CN  1041654 A  4/1990
CN  1113003 A  12/1995
(Continued)

OTHER PUBLICATIONS

T. Saito, et al., "An FM-CW radar module with front-end switching heterodyne receiver", IEEE MTT-S Digest, T-2, vol. 2, XP032363243A, 1992, pp. 713-716.

(Continued)

*Primary Examiner* — Timothy X Pham
(74) *Attorney, Agent, or Firm* — Oblon, McClelland, Maier & Neustadt, L.L.P.

(57) ABSTRACT

A fill level radar device including a transmission-power adjustment apparatus which is configured to adjust the power of the transmission signal depending on the frequency of the transmission signal in accordance with a predefinable correlation. As a result, frequency-dependent absorption changes in the filling material atmosphere can be compensated for by the device.

18 Claims, 8 Drawing Sheets

(30) Foreign Application Priority Data

Jun. 21, 2017 (EP) .................................... 17177111
Jun. 21, 2017 (EP) .................................... 17177147

(51) Int. Cl.
| | |
|---|---|
| *G01S 13/88* | (2006.01) |
| *H01Q 1/22* | (2006.01) |
| *H01Q 13/02* | (2006.01) |

(52) U.S. Cl.
CPC ............ *H01Q 1/225* (2013.01); *H01Q 13/02* (2013.01); *G01S 2007/4013* (2013.01)

(58) Field of Classification Search
CPC .... G01S 2007/027; G01S 7/02; G01S 7/4004; G01S 7/4056; G01S 11/023; G01S 13/02; G01S 13/0209; G01S 13/22; G01S 13/26; G01S 13/282; G01S 13/32; G01S 13/342; G01S 13/36; G01S 13/38; G01S 13/48; G01S 13/582; G01S 13/87; G01S 13/931; G01S 2007/028; G01S 2007/356; G01S 2007/4065; G01S 2007/4078; G01S 2007/4091; G01S 2013/9315; G01S 2013/9321; G01S 2013/93275; G01S 7/032; G01S 7/4017; G01S 7/4052; G01S 2007/4013; G01S 7/4008; E21B 33/068; E21B 33/072; E21B 43/121; E21B 47/003; E21B 47/047; E21B 47/13; E21B 49/087; G01B 7/26; G01B 15/00; H01Q 13/02; H01Q 1/225; B22D 2/003; G01N 22/00; G01N 9/24; G01V 3/12

USPC ...... 342/58, 70, 87, 109, 124, 127, 128, 129

See application file for complete search history.

(56) References Cited

U.S. PATENT DOCUMENTS

| | | | |
|---|---|---|---|
| 4,503,433 A * | 3/1985 | Tomasi | ................. G01S 13/343 342/124 |
| 4,661,817 A | 4/1987 | Bekkadal et al. | |
| 5,406,842 A | 4/1995 | Locke | |
| 5,629,706 A | 5/1997 | Bååth | |
| 6,122,602 A | 9/2000 | Michalski | |
| 6,486,826 B1 | 11/2002 | Cramer | |
| 8,319,680 B2 | 11/2012 | Sai | |
| 8,497,799 B2 | 7/2013 | Kleman | |
| 8,872,694 B2 | 10/2014 | Edvardsson et al. | |
| 9,291,443 B2 | 3/2016 | Kleman et al. | |
| 9,389,113 B2 | 7/2016 | Jirskog et al. | |
| 9,395,229 B2 | 7/2016 | Jirskog et al. | |
| 9,506,796 B2 | 11/2016 | Edvardsson | |
| 9,541,444 B2 | 1/2017 | Kleman | |
| 10,416,021 B2 | 9/2019 | Gorenflo et al. | |
| 2005/0052314 A1 | 3/2005 | Spanke et al. | |
| 2005/0168379 A1 | 8/2005 | Griessbaum et al. | |
| 2005/1666671 | 8/2005 | Peterson et al. | |
| 2011/0163910 A1 | 7/2011 | Sai | |
| 2011/0248725 A1 | 10/2011 | Mukherjee | |
| 2012/0169528 A1 | 7/2012 | Edvardsson | |
| 2012/0242530 A1 | 9/2012 | Luebbert et al. | |
| 2012/0299767 A1 * | 11/2012 | Kleman | ................. G01F 23/288 342/124 |
| 2013/0213132 A1 | 8/2013 | Wegemann | |
| 2014/0253147 A1 | 9/2014 | Kleman et al. | |
| 2014/0253366 A1 | 9/2014 | Kleman | |
| 2014/0298885 A1 | 10/2014 | Criel et al. | |
| 2015/0116142 A1 | 4/2015 | Jirskog | |
| 2015/0160066 A1 | 6/2015 | Sai | |
| 2015/0177163 A1 | 6/2015 | Edvardsson | |
| 2015/0253176 A1 | 9/2015 | Jirskog et al. | |
| 2015/0276462 A1 | 10/2015 | Kleman | |
| 2016/0103006 A1 | 4/2016 | Edvardsson | |
| 2016/0115784 A1 | 4/2016 | Littleford et al. | |
| 2016/0146658 A1 | 5/2016 | Littleford | |
| 2018/0031687 A1 | 2/2018 | Mueller | |
| 2018/0164145 A1 | 6/2018 | Daufeld et al. | |
| 2018/0262319 A1 * | 9/2018 | Xing | ..................... H04L 5/0012 |
| 2018/0328771 A1 | 11/2018 | Edvardsson | |
| 2020/0249068 A1 * | 8/2020 | Michalski | ............... G01S 13/88 |

FOREIGN PATENT DOCUMENTS

| | | | | |
|---|---|---|---|---|
| CN | 1234509 | A | 11/1999 | |
| CN | 101140180 | A | 3/2008 | |
| CN | 101322015 | A | 12/2008 | |
| CN | 101485074 | A | 7/2009 | |
| CN | 101492750 | A | 7/2009 | |
| CN | 101666668 | A | 3/2010 | |
| CN | 202382811 | U | 8/2012 | |
| CN | 102763001 | A | 10/2012 | |
| CN | 102798436 | A | 11/2012 | |
| CN | 103017868 | A | 4/2013 | |
| CN | 104713617 | A | 6/2015 | |
| CN | 104897242 | A | 9/2015 | |
| CN | 104977063 | A | 10/2015 | |
| CN | 105102942 | A | 11/2015 | |
| CN | 205037943 | U | 2/2016 | |
| DE | 694 33 175 | T2 | 6/2004 | |
| DE | 10 2009 057 191 | A1 | 6/2011 | |
| DE | 10 2015 109 463 | A1 | 12/2016 | |
| EP | 0 928 974 | A2 | 7/1999 | |
| EP | 1 707 982 | A1 | 10/2006 | |
| EP | 1 707 983 | A1 | 10/2006 | |
| EP | 1 992 922 | A2 | 11/2008 | |
| EP | 1 992 923 | A2 | 11/2008 | |
| EP | 1992923 | A2 * | 11/2008 | ........... G01F 23/284 |
| EP | 2 166 671 | A2 | 3/2010 | |
| EP | 2 293 096 | A2 | 3/2011 | |
| EP | 2 631 612 | A2 | 3/2013 | |
| EP | 2 491 355 | B1 | 12/2017 | |
| JP | 2013-253937 | | 12/2013 | |
| KR | 10-2015-0126532 | | 11/2015 | |

OTHER PUBLICATIONS

Office Action dated Aug. 28, 2020, in U.S. Appl. No. 16/014,634, 23 pgs.

Office Action dated Apr. 15, 2020 in U.S. Appl. No. 16/011,274, 13 pages.

Office Action dated May 15, 2020 in U.S. Appl. No. 16/014,501; 9 pages.

U.S. Office Action dated Jul. 9, 2020 in co-pending U.S. Appl. No. 16/008,456 (15 pgs.).

Notice of Allowance dated Sep. 3, 2020 in co-pending U.S. Appl. No. 16/014,501 (11 pgs.).

U.S. Office Action dated Sep. 22, 2020 in co-pending U.S. Appl. No. 16/011,274 (13 pgs.)

Notice of Allowance dated Feb. 3, 2021 in co-pending U.S. Appl. No. 16/014,634; (17 pgs.)

Office Action dated Mar. 22, 2021 in China Patent Application No. 201810643215.3 with English translation; 15 pgs.

Office Action dated Mar. 24, 2021 in China Patent Application No. 201810629191.6 with English translation; 16 pgs.

Office Action dated Mar. 24, 2021 in China Patent Application No. 231810642348.9 with English translation; 21 pgs.

Office Action dated Mar. 23, 2021 in China Patent Application No. 201810646168.8 with English translation; 19 pgs.

Office Action dated Mar. 26, 2021 in China Patent Application No. 201810643156.X with English translation; 16 pgs.

\* cited by examiner

FILL LEVEL RADAR DEVICE HAVING CONTROLLED TRANSMISSION POWER

CROSS-REFERENCE TO RELATED APPLICATIONS

This application claims the benefit of the filing date of European Patent Applications No. 17 177 111.6 filed on 21 Jun. 2017 and No. 17 177 147.0 filed on 21 Jun. 2017, the entire contents of each of which are hereby incorporated herein by reference and of German Patent Applications No. 10 2017 210 383.3 filed on 21 Jun. 2017, No. 10 2017 210 381.7 filed on 21 Jun. 2017, No. 10 2017 210 382.5 filed on 21 Jun. 2017 and No. 10 2017 210 402.3, filed on 21 Jun. 2017, the entire contents of each of which are hereby incorporated by reference.

FIELD

The embodiments relate to fill level measurement technology. In particular, the embodiments relate to a fill level radar device comprising a transmission-power adjustment apparatus, to a method for determining a fill level, to a program element and to a computer-readable medium.

BACKGROUND

Fill level radar devices determine the fill level from the delay time of electromagnetic waves that are emitted by the measurement device as a transmission signal and are re-received after being reflected by the filling material. A distance between the measurement device and the filling material can be ascertained from the delay time of the electromagnetic waves and, from said distance, a filling level of a container equipped with the measurement device can be ascertained in turn. The electromagnetic waves can be high-frequency waves or microwaves. The waves may be freely emitted by the measurement device towards the filling material or, alternatively, they may be guided back and forth by a waveguide.

Various measurement methods are known for measuring the delay time of electromagnetic waves between the emission and receipt thereof. In principle, it is possible to distinguish between methods which measure the delay time of very short transmission pulses, usually referred to as pulse radar, and measurement principles which are based on the modulation of continuously emitted signals. These methods, known as CW (continuous-wave) radar, involve constant emission throughout a measurement process, whereby, in contrast with the pulse method, the transmission duration within a measurement cycle is typically longer, by orders of magnitude, than the delay time of the signals.

By modulating the transmission and reception waves, the delay time can be indirectly determined in the process. In the FMCW method (frequency-modulated continuous wave), linear frequency modulation can be used for this purpose.

SUMMARY

The present disclosure describes increasing the measurement accuracy of fill level radar devices.

The described embodiments, together with further advantages, will be best understood by reference to the following detailed description taken in conjunction with the accompanying drawings. A described embodiment relates to a fill level radar device comprising a signal source arrangement that is configured to generate an electromagnetic transmission signal of which the duration is greater than the time required for the transmission signal to travel from the signal source arrangement to the filling material, be reflected thereby, and then travel back to the fill level radar device and the analysis circuit thereof.

The fill level radar device further comprises a transmission-power adjustment apparatus or circuit which is configured to adjust the power of the transmission signal depending on the frequency of the transmission signal. This dependency corresponds to a predefinable correlation which can be selected such that the power of the transmission signal changes when a sweep of the frequency band used is carried out.

According to one embodiment, the fill level radar device is designed as a CW fill level radar device. The frequency of the transmission signal can in this case be modulated and pass through a linear or stepped ramp during a measurement phase or measurement cycle for example. In this context, this is known as an FMCW method or a stepped CW method. If the transmission signal is a stepped transmission signal having a frequency that is constant in portions, then the individual frequencies of the transmission signal are within a defined frequency band, for example at a constant distance from one another.

A measuring phase or measuring cycle may start at the time at which the signal source starts to generate the stepped electromagnetic transmission signal and the transceiver circuit starts to transmit the transmission signal towards the filling material. The measuring phase may stop when all data required for fill level determination has been acquired, i.e., when the device is ready to determine the fill level.

According to one embodiment, the fill level radar device is designed to be connected to a 4 to 20 mA two-wire loop, via which the fill level radar device is provided with the energy required for measuring and via which the device sends measurement data and can receive parametrisation data from an external entity.

According to one embodiment, the predefinable correlation is dependent on the temperature of the filling material, the temperature in the container, the pressure in the container, the composition of the filling material, the composition of the container atmosphere and/or the radiation attenuation properties or absorption properties of the container atmosphere. For instance, the predefinable correlation can for example take account of the fact that, within given boundary conditions (pressure in the container, composition of the filling material, temperature in the container), the container atmosphere can attenuate the transmission signal to a greater or lesser degree depending on the frequency. This effect can be corrected or, at least in part, compensated for by sending the signal with increased power when attenuation is stronger.

According to a further embodiment, the predefinable correlation is dependent on the installation location of the fill level measurement device, it being possible in particular for national borders to play a role in this case. For example, it can be provided that, in a specific country, the fill level radar device, at specific frequencies, transmits at a different power than in another country. It can also be provided that, at a very specific location (for example, because many other measurement devices are arranged there in close proximity) the fill level radar device, at specific frequencies, transmits at a lower power than at other locations. In particular, in can be provided that the fill level radar device determines the installation location itself. For this purpose, a position sensor is provided in the measurement device, for example a GPS module. According to one embodiment, the measurement device, when it knows the installation location thereof, can automatically obtain the predefinable correlation from an external entity. Alternatively, it is provided that the predefinable correlation is already stored in a database of the measurement device or is calculated automatically by the measurement device.

It goes without saying that the predefinable correlation can also depend on a plurality of boundary conditions, not only the installation location but also on the conditions in the container (pressure, temperature, etc.).

Moreover, the predefinable correlation can also depend on the energy available for measurement and/or the required measurement accuracy. If there is a shortage of this energy, the transmission power, at least in certain frequency ranges, can be turned down.

According to a further embodiment, the fill level radar device comprises an analysis circuit for determining the fill level by using the predefinable correlation.

According to a further embodiment, the fill level radar device comprises a control circuit for changing the predefinable correlation during an operational phase of the fill level measurement device. A change in the predefinable correlation may for example occur when the conditions inside the container change, for example, because the absorption properties or the radiation attenuation properties of the container atmosphere change.

According to a further embodiment, the control circuit is configured to determine the predefinable correlation by using parameters that are input by the user or detected by the fill level measurement device. Said parameters may for example be the above-described conditions in the container, but also the installation location of the fill level measurement device, for example. In particular, the fill level measurement device can comprise a sensor arrangement which can automatically determine at least some of the above-mentioned parameters, for example a pressure gauge or a temperature sensor and, as described above, a position sensor.

According to a further embodiment, the fill level radar device comprises a transceiver circuit which is configured to emit the transmission signal towards a filling material surface and to receive the transmission signal reflected by the filling material surface and mix the received reflected transmission signal with a further signal in order to form a reflection-dependent reception signal, from which the fill level can be determined. Depending on the embodiment, the mixing can take place in a heterodyne or homodyne manner.

A further embodiment relates to a method for determining the fill level in which an electromagnetic transmission signal is generated of which the duration is greater than double the delay time of the transmission signal from the signal source to the filling material. The power of the transmission signal can be adjusted depending on the frequency of the transmission signal in accordance with a predefinable correlation, as already described above.

At this point, it should be noted that the features of the fill level radar device described above and in the following may also be implemented as method steps and the features according to the method and described in the context of the embodiments can be carried out by the fill level radar device.

A further embodiment relates to a program element which, when executed on a processor of a fill level radar device, prompts the fill level radar device to carry out the method steps described above and in the following.

A further embodiment relates to a computer-readable medium, on which the above-described program element is stored.

Controlling and altering the emitted power of the transmission signal in a targeted manner during a measurement cycle of the fill level radar measurement device may be performed in order to improve the operating performance thereof.

Embodiments are described hereinafter with reference to the drawings. Where the same reference signs are used in the drawings, they denote the same or similar elements. The views in the drawings are schematic and not to scale.

BRIEF DESCRIPTION OF THE FIGURES

Embodiments are described hereinafter with reference to the drawings. Where the same reference signs are used in the drawings, they denote the same or similar elements. The views in the drawings are schematic and not to scale.

DETAILED DESCRIPTION OF EMBODIMENTS

Figure 1:
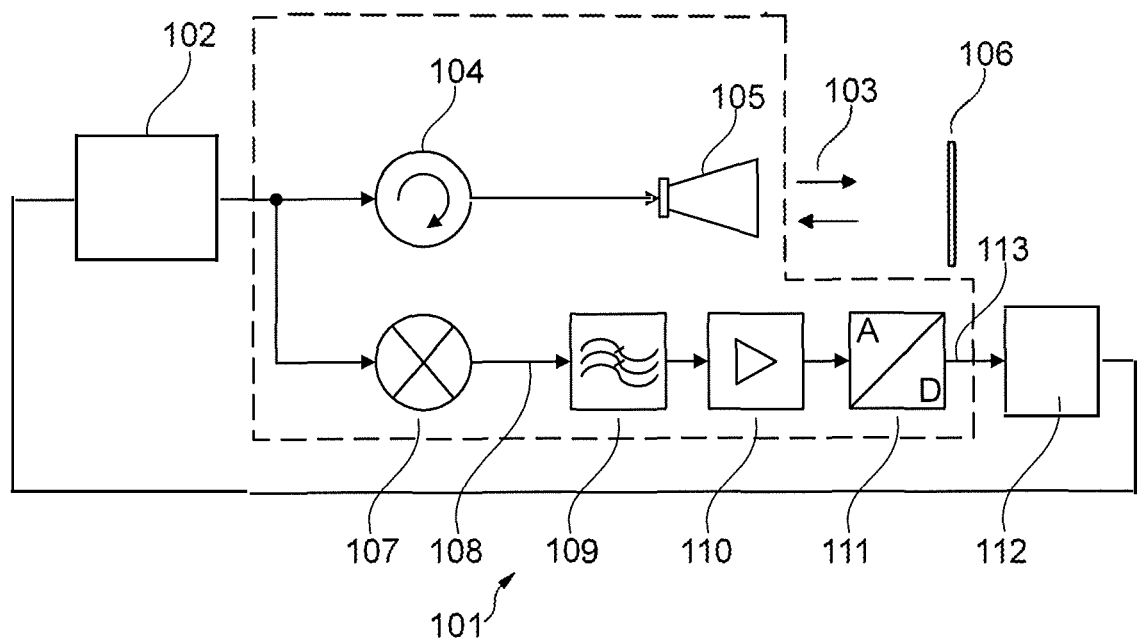
FIG. 1 is a circuit diagram of a fill level radar device.

FIG. 1 is a highly simplified block diagram showing the basic structure of a transceiver circuit 101 of an FMCW fill level radar device. The synthesiser 102 is used to generate the transmission signal 103 and contains for example a VCO (voltage-controlled oscillator) for this purpose. The transmission signal is frequency-modulated in a linear manner via a circuit, contained in the synthesiser 102, for controlling the transmission frequency, for example a PLL (phase-locked loop) circuit.

Said transmission signal 103 reaches the antenna 105 via the circulator 104 and is transmitted by said antenna towards a reflector 106. The reception signal returning to the antenna 105 after being reflected reaches the mixer 107 via the circulator 104.

Said mixer mixes the reception signal with part of the transmission signal, thereby creating what is known as a beat signal 108. After low-pass filtering in the filter 109 and appropriate amplification in the amplifier 110, said beat signal is digitalised by an analogue-to-digital converter 111 and is further digitally processed thereafter. The mixing of the transmission signal and the reception signal is in this case referred to as a homodyne receiver principle. The distance between the reflector 106 and the measurement device has a direct effect on the frequency of the beat signal 108, which is why, conversely, the measurement distance can be directly deduced from the measured beat frequency.

Figure 2:
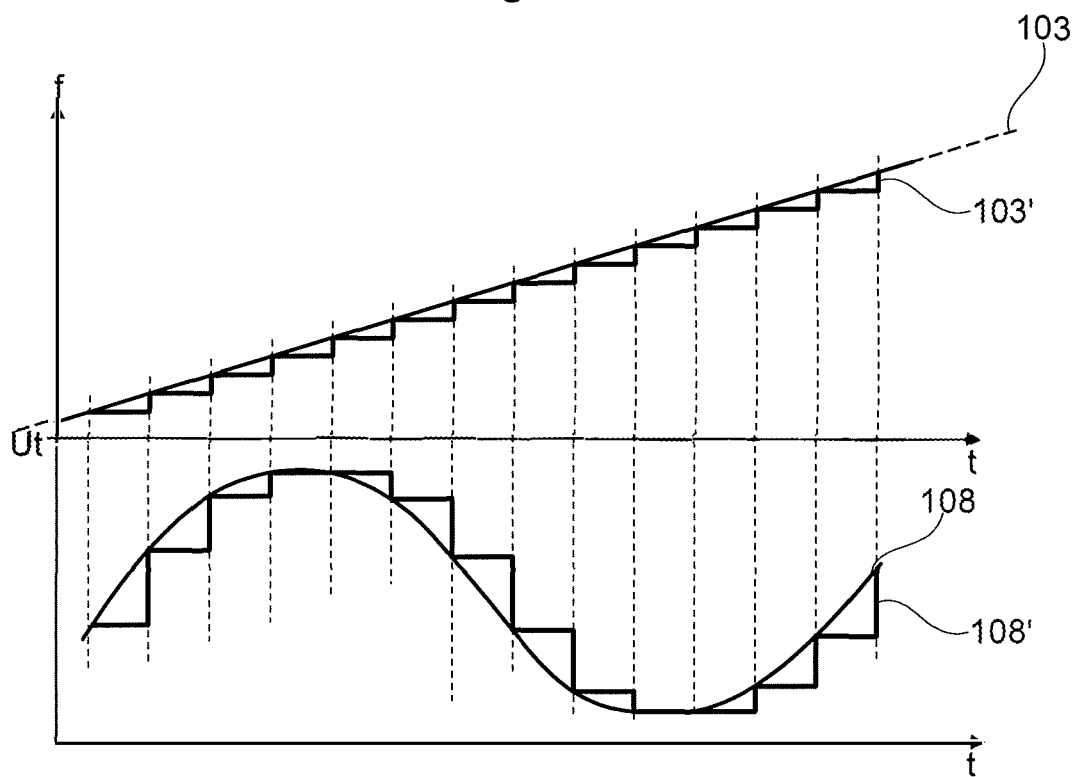
FIG. 2 shows examples of transmission signals and the corresponding reflection-dependent reception signals.

A plurality of reflectors results in a beat signal 108 that has a frequency mix made up of the individual frequencies associated with the various measurement distances. It is therefore usual for the digitalised beat signal to undergo spectral analysis within a controller circuit 112, for example using Fourier transformation or fast Fourier transformation (FFT) in order to separate the individual frequency components or reflection components and optionally to precisely define said portions in terms of the frequency thereof and thus the underlying measurement distance. FIG. 2 shows a portion of the transmission signal 103 having the linear frequency modulation in a time/frequency graph and shows, by way of example directly therebelow in a time/voltage graph, an associated analogue beat signal 108 which results at a defined reflector distance.

A variant of the FMCW method is the modification of the linear frequency modulation of the transmission signal into stepped-linear frequency modulation, as shown in FIG. 2 as an alternative 103'. In this case, the transmission signal 103' remains at a specific frequency for a certain period of time, and then hops to the next frequencies in even steps. On account of the homodyne mixing according to the block diagram from FIG. 1, which is also applicable here, DC voltage occurs at the mixer output for each frequency step, which voltage results from the mutual phase shift of the transmission signal and the reception signal. The DC voltages resulting from each step result, in succession, in a signal curve 108' that corresponds to the beat frequency 108 of the previously described FMCW method. This is also shown in FIG. 2 as a portion.

As is clear from the figure, the previously continuous beat signal 108 is converted into a stepped analogue signal 108'. In the case of a subsequent analogue-to-digital conversion of said stepped signal 108', it is naturally expedient to convert exactly one sample value per step, meaning the digitalised beat signal of the stepped linear frequency modulation does not substantially differ from the digitalised beat signal of a standard FMCW method. The further digital signal processing, beginning with the spectral analysis, is therefore identical in both methods.

Figure 3:
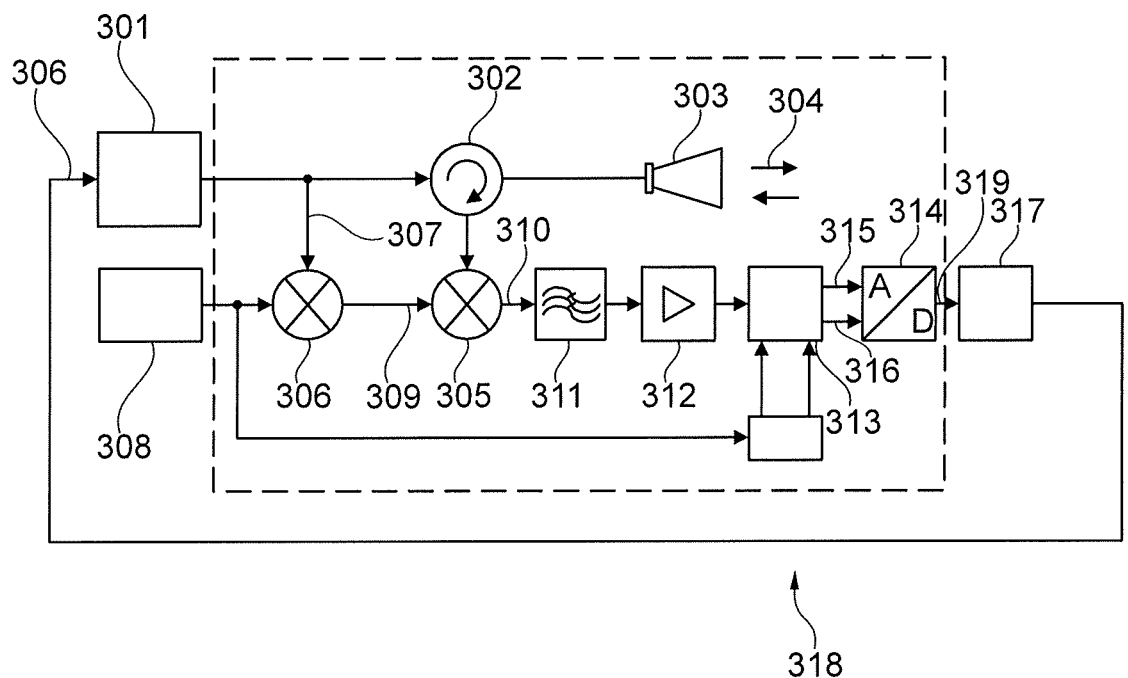
FIG. 3 is a circuit diagram of a further fill level radar device.

FIG. 3 is a block diagram of a measuring method that is an alternative to the above-described FMCW method. This differs from the transceiver circuit 101 shown in FIG. 1 by, inter alia, a heterodyne circuit design that provides a reception mix of the received signal with a local oscillator signal having a variable frequency, resulting in an intermediate frequency at the mixer output.

Just as in FIG. 1, a transmission signal is generated by the synthesiser 301 and is directed via the circulator 302 or directional coupler 302 to the antenna 303, and emitted thereby. In the process, the antenna 303 converts a high-frequency signal supplied via a line into an electromagnetic wave 304, which is either freely emitted or, alternatively, is guided via a waveguide, for example a hollow conductor or a single-wire or multi-wire conductor, towards the reflector. At least part of the wave reflected by the reflector arrives back at the antenna 303 and is converted back into a conducted reception signal. Said signal then reaches the reception mixer 305 via the circulator 302 or directional coupler 302.

The circulator or directional coupler 302 is an element that is known in the field of radar fill level measurement and can advantageously be used in a monostatic operation, i.e. when using the same antenna for transmitting and receiving. Said circulator or coupler has at least three ports and directionally guides signals from one port primarily to a second port, while the third port is decoupled in this case. In a bistatic operation, which is also possible but is not shown here in more detail, two separate antennas are used for transmitting and receiving. In this case, the circulator or directional coupler 302 is omitted, and the signal reaches the transmission antenna via the synthesiser 301, and the reception mixer 305 via the reception antenna.

The synthesiser 301 is used to generate various sinusoids at varying frequencies in a pre-established frequency band, the frequency remaining at a set value for a certain period of time and then hopping to a new set frequency value. This can occur in the form of stepped-linear frequency modulation, for example. For this purpose, the synthesiser contains a tuneable oscillator, for example a VCO (voltage-controlled oscillator). In addition, it advantageously contains a regulation loop and a reference oscillator. The regulation loop, for example a phase-locked loop (PLL), regulates the frequency of the tuneable oscillator such that said frequency is in a defined, adjustable relationship with respect to the frequency of the reference oscillator. The frequency relationships are advantageously adjusted digitally, for example in a controlled manner by a controller circuit 317 by means of the signal 306, and usually signifies switching one or more divider modules, which divide the frequency of the reference oscillator and/or of the tuneable oscillator. In this case, in addition to simple integer dividers, non-integer dividers, so-called fractional-n dividers, are also possible. Using dividers of this kind makes it possible to adjust the output frequency of the synthesiser 301 in very fine steps over a relatively large frequency range. Part of the output signal of the synthesiser 301 is diverted, for example via a power splitter (not shown in more detail) or coupler, in order to produce the local oscillator signal for the reception mixer 305. For this purpose, the diverted synthesiser signal 307 is mixed by the mixer 306 with an output signal of a second synthesiser 308, meaning that various new frequency components, such as the sum frequency and the difference frequency, result from the two input frequencies.

Said second synthesiser 308 is in principle made up of the same functional units as the previously described synthesiser 306. As a regulation variable of the (phase-locked/) regulation loop, it is not the output frequency of the synthesiser 306, but the mixer output signal 309 of the mixer 306 that is used to produce the difference frequency between the two synthesiser signals. Said difference frequency is therefore corrected by the regulation loop of the synthesiser 308 to a pre-established value, which is either stored permanently in the PLL/regulation loop of the synthesiser 308 or is programmed therein by the controller circuit 317.

The output signal of the synthesiser is used as the local oscillator signal for the heterodyne reception mixing in the reception mixer 305. In the reception mixer 305, inter alia the difference frequency of the local oscillator signal and the reception signal results from the two signals. Said output signal of the reception mixer 305, referred to as the intermediate frequency signal 310, has, in addition to the above-mentioned fixed frequency, a phase position which, together with the amplitude of the intermediate frequency signal, defines a complex parameter of the reflection coefficients of all reflectors involved in reflecting the wave. Or, in other words, the phase position of the intermediate frequency signal is dependent on the reciprocal phase position of the local oscillator signal and the reception signal. The phase position of the reception signal, for its part, is dependent on the distance travelled by the transmitted or received wave, and therefore on the reflector distance, whereas the phase position of the local oscillator signal is dependent on the synthesiser output signal, and therefore on the transmitted signal. The phase position of the intermediate frequency signal is therefore ultimately dependent only on the phase shift between the transmission signal and the reception signal, and therefore on the reflector distance.

Said intermediate frequency signal is band-filtered in the band filter 311 and amplified in the intermediate frequency amplifier 312 in order to increase the signal-to-noise ratio. In order to determine the complex reflection coefficients from the analogue intermediate frequency signal, the intermediate frequency signal can be broken down into its complex parts, i.e. the real and the imaginary part, by using a quadrature modulator 313, and the two components can separately undergo an analogue-to digital conversion thereafter. The advantage of using the quadrature modulator is that the real and imaginary part of the intermediate frequency signal are present as baseband signals 315, 316, i.e. there are no longer any high-frequency components and digitalisation is thus very simple.

As already described, the measured values are further processed in the controller circuit 317 after the analogue-to-digital conversion by the analogue-to-digital converter 314. In addition to program code for analysing the digitalised measurement signals, the circuit part 317 also contains in particular program code for sequence control of a measurement cycle, i.e. for initiating the emission of the waves and for controlling the frequencies, and for the general control of the transceiver circuit 318.

The circuit arrangement shown in FIG. 3 allows, as described, the determination of a complex reflection coefficient. Said complex reflection coefficient is made up of all the reflection components contained in the received signal. If a plurality of reflectors are involved, the individual signal components can no longer be separated, and it is not possible to determine the distance of the individual reflectors. If this measurement is repeated at additional set output frequencies within a specific frequency band, a digital value table can be drafted which consists of the set frequency values and the associated complex reflection coefficients. Advantageously, the frequency intervals between all the frequency values are selected so as to be equal, such that the frequency values divide the frequency band up into equidistant portions. This results in the band-limited spectrum of the digital reflection coefficients, which subsequently undergoes inverse Fourier transformation in a controller circuit 317, for example IFFT (inverse fast Fourier transformation) in the case of equidistant frequency intervals, which transforms the frequency signal into a time signal. Said digital time signal is in turn representative of the sum of the reflections of the transmitted and re-received measurement signal. The digital time signal is present in the form of a value table of time values and associated reflection components and can be analysed in terms of ascertaining local maxima. Said local maxima characterise the individual reflections of the various reflectors, which were received according to the allocated time. In this form, this time/reflection amplitude value table is now equivalent to the digitalised reflection profiles that are common in known fill level radar methods. Further analysis steps for determining the sought-after echo of the fill level surface and the determination of the exact reflection time of said echo can therefore be adopted from the known methods of pulse radar or FMCW radar systems.

Figure 4:
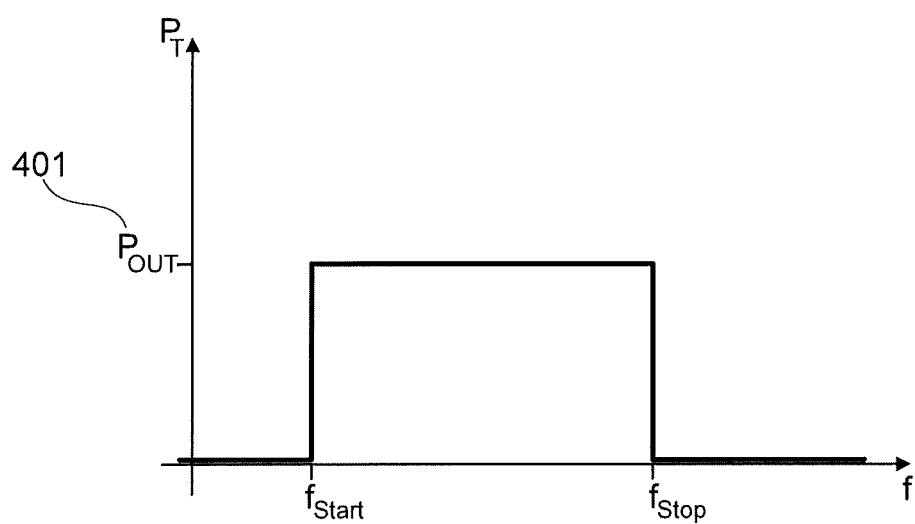
FIG. 4 shows the power of a transmission signal as a function of the frequency thereof.

It is common in many fill level measurement devices based on the radar principle for the high-frequency energy generated by the measurement circuit 101, 318 to be substantially constant in the relevant working range. FIG. 4 shows the corresponding behaviour. The high-frequency energy radiated by the measurement device is set in the relevant working range between $f_{Start}$ and $f_{Stop}$ to a substantially constant output power Pout 401, depending on the capacity of the circuit elements and the maximum levels specified by certification requirements.

Figure 5:
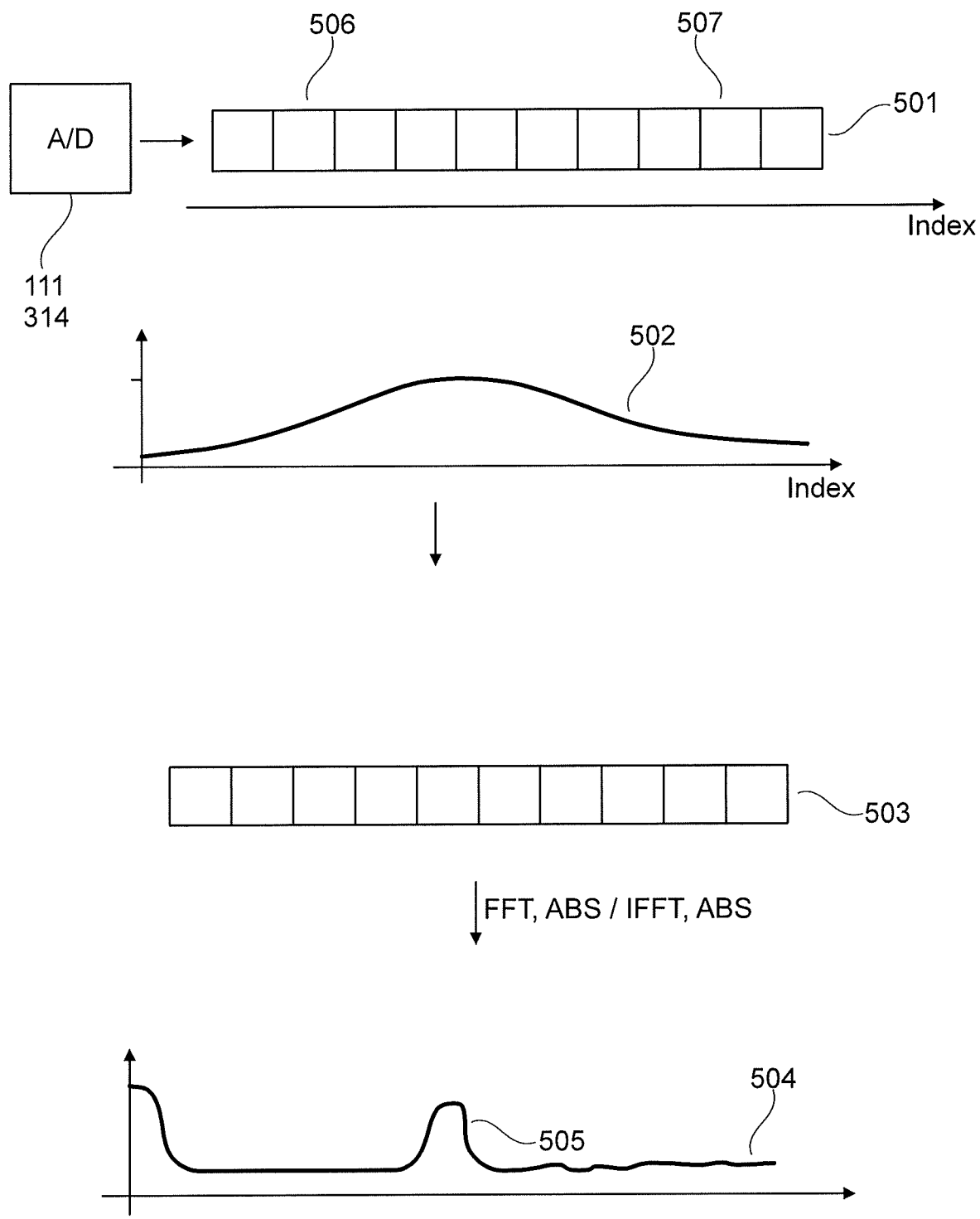
FIG. 5 shows steps for further processing digitalised sample values.

FIG. 5 shows, by way of a sequence diagram, key steps for further processing the digitalised sample values 113, 319, which are calculated in the relevant controller 112, 317 of the measurement device. In order to improve the spectral analysis, the digitalised signal values 501 are initially weighted by means of multiplication using a window function 502. The functions that can be used at this point, for example a Bartlett window or a Hamming window, improve in particular the side-lobe suppression during the spectral analysis. Finally, in the case of a radar system that is continuously or incrementally frequency-modulated using FFT and subsequent absolute-value formation, the windowed signal 503 is converted into an echo curve 504. In the reflectometer method according to FIG. 3, IFFT together with subsequent absolute-value formation preferably leads at this point to the creation of the echo curve 504. The echo curve 504 can be checked for a filling material echo 505 using methods known to a person skilled in the art, and the position of said echo can be provided externally by the controller 112, 317.

A number of boundary conditions are explained in the following which are intended to clarify a particular advantage of the embodiments.

It is very often the case when using radar fill level sensors that the energy or power to be provided to the sensor is limited by external circumstances. Limited energy is available if the sensor is powered by an energy storage device having a finite capacity, for example a battery or an accumulator. It is also very often the case that a radar fill level sensor is operated as a so-called two-wire sensor. This means that the measurement device is both supplied with energy (for example at a current of 4-20 mA) by a single pair of wires, known as a two-wire line, and also sends the measured value via said pair. An important parameter for optimising the energy required by the sensor is the optimisation of the transmission power 401 emitted by the sensor.

Figure 6:
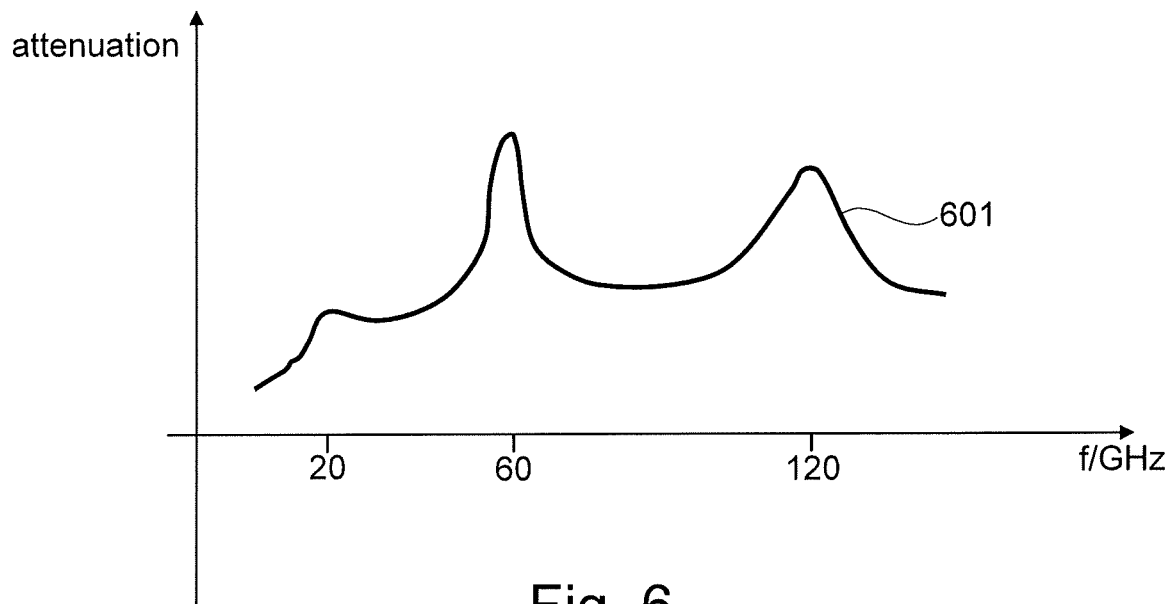
FIG. 6 shows the attenuation of electromagnetic waves in a water vapour atmosphere as a function of the frequency.

Another important optimisation approach results from the fact that, in the case of measurements in containers having a superimposed gas phase, absorption behaviour, that is occasionally pronounced, is present in at least one sub-range of the frequency spectrum used for measurement. In the case of working frequencies in the range of from 0 . . . 240 GHz conventionally used in microwave measurement devices, corresponding weakening of the microwave signals can be observed in particular in the case of closed containers and when a water-vapour-saturated or ammonia-saturated atmosphere emerges. FIG. 6 shows the attenuation of electromagnetic waves in a water vapour atmosphere as a function of the frequency. The attenuation behaviour of the corresponding gas phases depends on the medium as well as on the temperature and the pressure inside the container.

Figure 7:
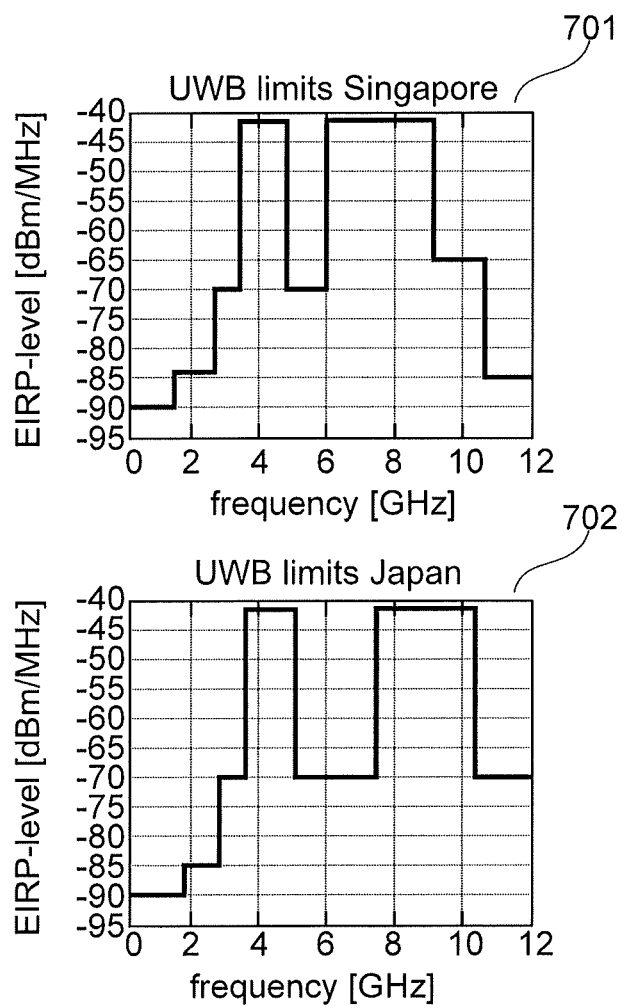
FIG. 7 shows two example of maximum permitted transmission levels.

As a result of markets growing ever closer together on a global scale and the demand for a production rate that is as high as possible, producers of modern sensors have to be capable of meeting the legal and regulatory requirements of a number of different countries. In the case of radar sensors, there are sometimes different specifications in different countries in relation to the power of electromagnetic signals emitted by the measurement device, which specifications are often defined in corresponding radio certification standards. FIG. 7 shows, by way of example, the maximum permitted transmission levels for Singapore 701 and Japan 702 in the range of from 0 . . . 12 GHz. In known radar devices, there are two different approaches for taking account of the power levels shown. Firstly, it is possible to limit the emitted power to the minimum of what is allowed in the frequency range used in the entirety of the national certifications in question. A disadvantage in this case is that the reliability and/or accuracy of the actual measurement can be reduced. A second possibility is that devices are produced ex works for exactly one specific target sales country and the relevant limits for the permissible emitted power are observed. However, this leads to an increased range of devices for the manufacturer, which can lead to increased costs.

Figure 8:
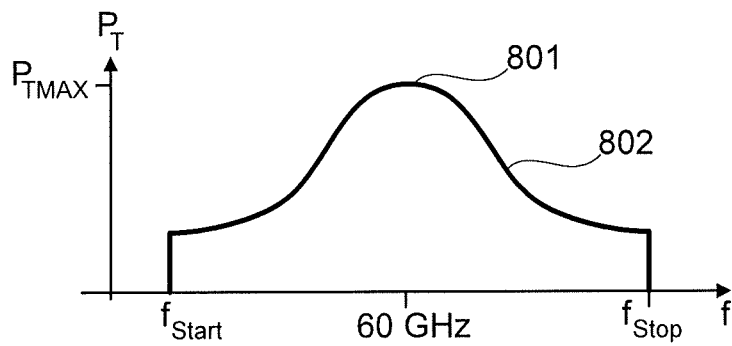
FIG. 8 shows the curve of the transmission power according to a first compensation.

According to one embodiment, the attenuation behaviour of a known medium (cf. FIG. 6) can be compensated for, at least in part, by adaptive control of the transmission power emitted by the fill level measurement device. FIG. 8 shows the curve of the transmission power according to a first compensation. In one embodiment, the measurement device works in the range between $f_{Start}$=57 GHz and $f_{Stop}$=64 GHz. In a known medium and in a resultant, known gas atmosphere, known working pressure and/or known temperature inside a container, the measurement device can automatically establish that a maximum attenuation of the signal will be reached, for example at 60 GHz. For example, the attenuation behaviour of the container atmosphere, depending on the conditions in the container, is stored in a database of the measurement device. As a result, the measurement device will emit the maximum possible signal power $P_{TMAX}$ 801 at exactly said frequency and reduce the transmission power in the other ranges. This provides substantially constant reliability of the measurement over various frequencies and additionally minimises the energy required by the measurement device, which can lead to an increase in the measurement repetition rate.

Figure 9A:
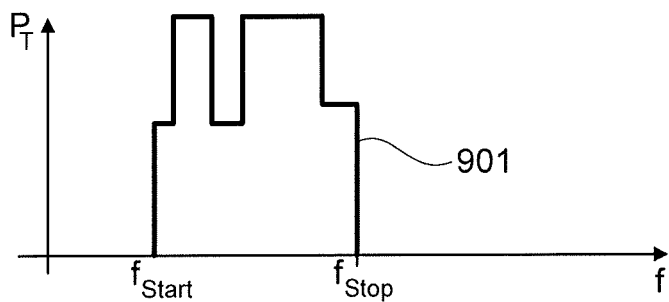
FIGS. 9a and 9b show examples of an adaptive adjustment of the transmission power of the fill level measurement device.
Figure 9B:
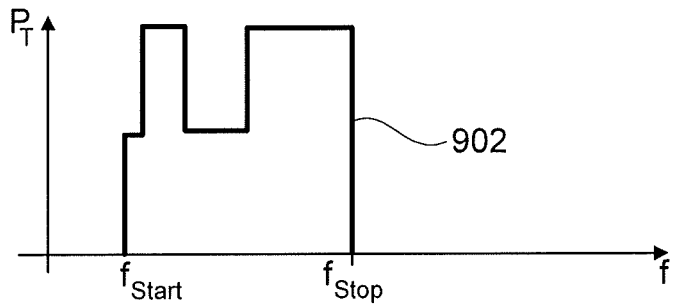

According to another embodiment, the adaptive adjustment of the transmission power emitted by the fill level measurement device is based on the relevant installation location. FIG. 9a and FIG. 9b show embodiments of a measurement device having an exemplary working frequency of between 3 GHz and 9 GHz. If it is ascertained, for example, by appropriate parametrisation by the user or by automatic determination of the current installation location, that the device is being operated within the territory of the state of Singapore, the device then regulates the emitted power fully automatically according to the maximum emission level permitted by law as shown in FIG. 9a. However, if the device is installed in Japan, then, after an appropriate input or a fully automatic location determination, the emitted transmission level can be optimised according to the curve in FIG. 9b for the characteristic curve allowed in Japan. An advantage of the described approach is that no country-specific device designs have to be produced, and the maximum permitted transmission level can be optimally utilised in the particular country, which can contribute to increased measurement reliability.

Figure 10:
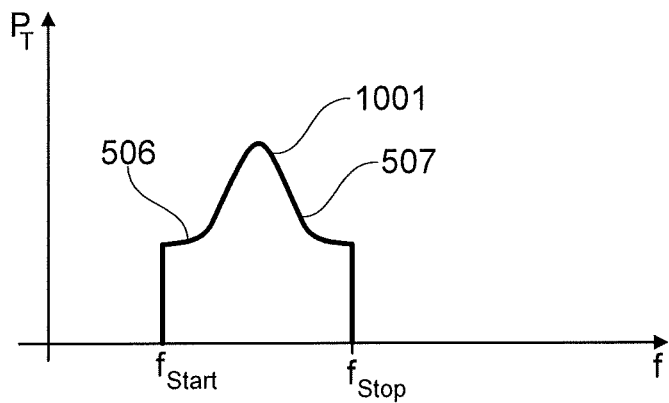
FIG. 10 shows a further approach for improving the operating performance of the fill level measurement device.

FIG. 10 shows a further approach for improving the operating performance of radar fill level measurement devices. Whereas in certain embodiments the transmission power is kept almost constantly within the working frequency range between $f_{Start}$ and $f_{Stop}$, it can be particularly advantageous to regulate the transmission power emitted in the corresponding frequency range such that said power substantially follows the characteristic curve of a window function 502. Since the information obtained by the A/D converter 111, 314 is already strongly suppressed at the start 506 and the end 507 of the working range by the application of the window function 502, this calculation step can be brought forward from the digital signal processing into the actual measured value acquisition. If the emitted transmission power follows the curve shown in FIG. 9, then reapplying a window function 502 within the digital signal processing can be avoided. This has the effect that, while the measurement values 501 are detected, energy is saved by reducing the emitted power in sub-ranges of the working range and, furthermore, the digital signal processing can be accelerated, which can also contribute to saving energy. By way of the described measures, the measurement device can carry out an individual measurement with a reduced energy demand, which, overall, can additionally lead to an increase in the measurement repetition rate, and the measurement reliability can therefore be improved.

Figure 11:
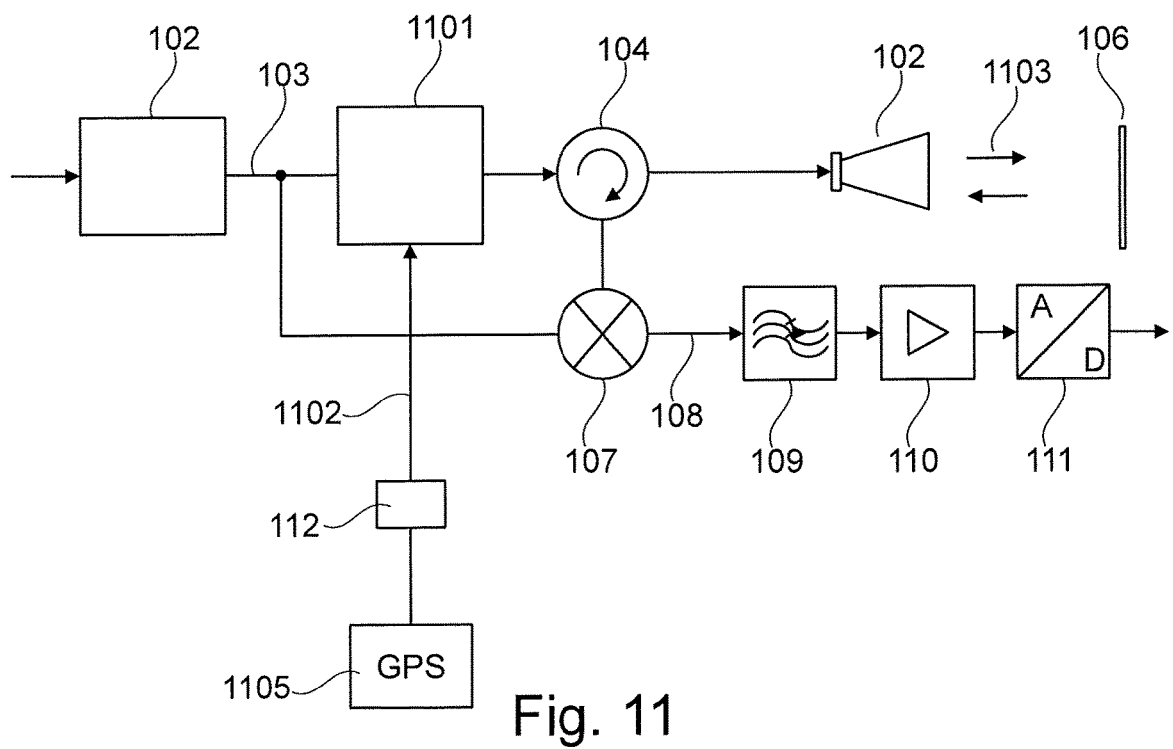
FIG. 11 shows a fill level radar device according to one embodiment.

FIG. 11 shows a fill level radar device for implementing frequency-dependent transmission power regulation in a system 101 according to the FMCW method. The signal 103 generated by the synthesiser 102, on its way to the antenna 105, initially passes through a transmission-power adjustment apparatus 1101 which amplifies and/or attenuates the power of the transmission signal 1103 that is emitted by the antenna, depending on the current signal frequency. This is technically implemented inside the transmission-power adjustment apparatus, for example by a filter bank produced according to microstrip technology in conjunction with high-frequency circuits, which filter bank can provide a plurality of predefined power transmission characteristics 802, 901, 902, 1001 by filtering the signal 103. Selecting the required filter bank and thus setting the desired power transmission characteristics can be carried out by the controller system 112 via a control input 1102. Alternatively, further integrating microwave technology into highly integrated circuits provides the option of adjusting the amplification of the signal 103 in real time during a measurement cycle via a control signal 1102 and a very fast reacting variable-gain amplifier (VGA). Particularly advantageously, the power-transmission adjustment apparatus 1101 is programmed with the desired amplification values via the control input 1102, for example a digital SPI input, before the measurement is carried out. The amplification values stored in a lookup table within the circuit 1101 can influence the amplification characteristic of a known VGA circuit in the pre-established, desired manner by means of a suitably fast clock-out and very fast digital-to-analogue conversion, and thus contribute to implementing the method described above and in the following.

A position sensor 1105 is provided which can ascertain the position of the fill level radar device and can forward the positional data to the control circuit 112.

An apparatus for implementing the method described above and in the following is configured in a substantially simpler manner in a circuit 318 according to the reflectometer principle, as is described with reference to FIG. 3.

Figure 12:
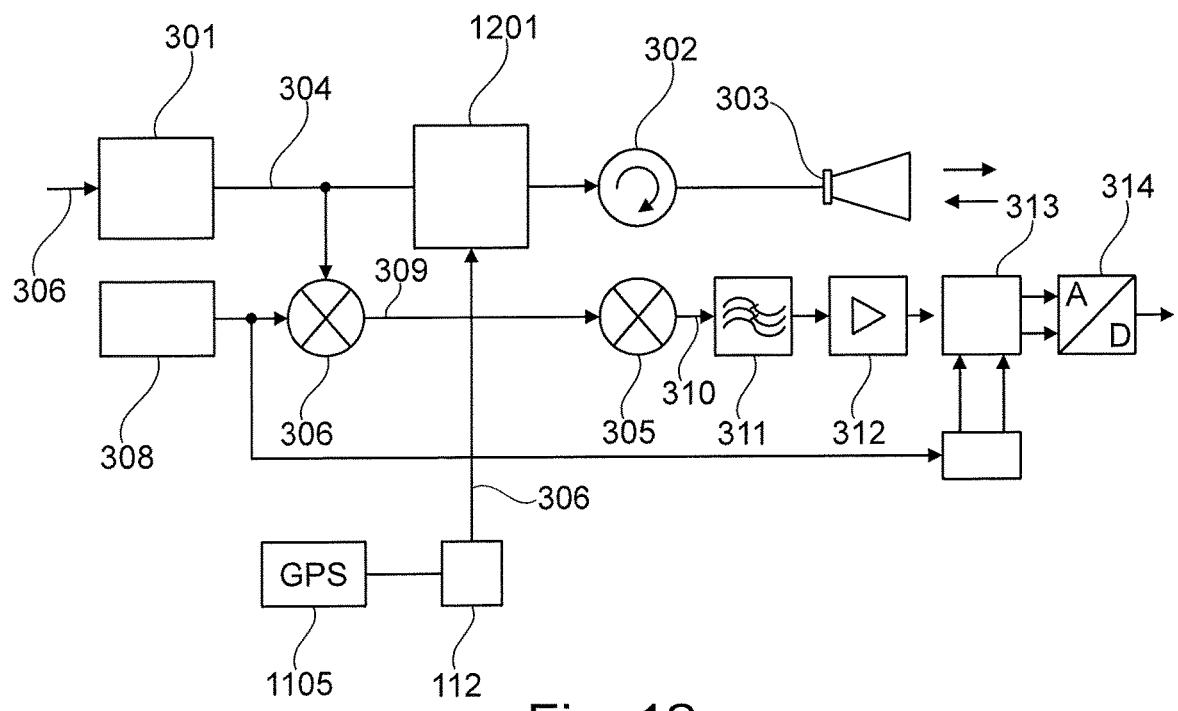
FIG. 12 shows a further fill level radar device according to one embodiment.

FIG. 12 shows a corresponding circuit. The signal 304 generated by the synthesiser 301 and having a predefinable frequency that is fixed in the relevant measurement portion is applied for a significantly longer time than is the case in a continuously or incrementally frequency-modulated FMCW circuit according to FIG. 11. A conventional, digitally adjustable amplification element can therefore be selected as the transmission-power adjustment apparatus 1201. Because a frequency to be measured is systematically switched from one to the next by the controller circuit 317 via a control line 306, the same control line 306 can be used to adjust the new amplification value within the power-transmission adjustment apparatus 1201.

A further significant aspect for implementing the method described above and in the following relates to the digital signal processing conventionally carried out within the controller circuit 112, 317, as is shown in FIG. 5. As a result of the power transmission level being adjusted on the basis of the transmission frequency, the measurement device can be improved further if said level adjustment is considered as part of the signal processing.

Figure 13:
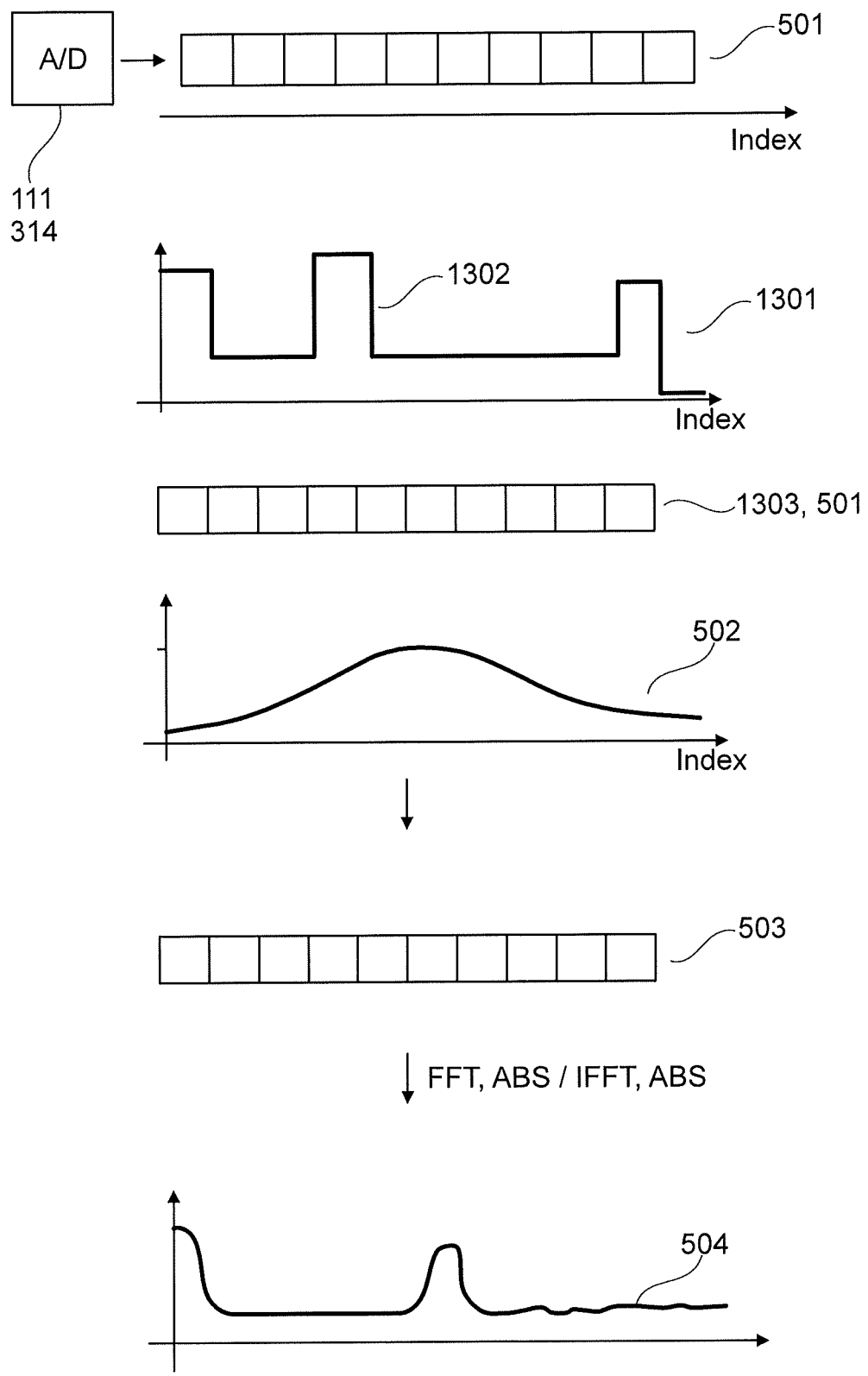
FIG. 13 shows an example of modified digital signal processing.

FIG. 13 shows an embodiment of the correspondingly modified digital signal processing. The present embodiment assumes that, within the transmission branch, a transmission level 901 is generated according to the curve in FIG. 9 and has been emitted from the fill level measurement device for the purpose of measurement. The intermediate frequency signal 501 detected by the A/D converter 111, 314 is present in the storage device in entirely digital form after the measurement procedure has been completed. Since the amplitude variation present during the measurement corresponds, in terms of signal, to an amplitude modulation, and the result of the measurement is derived from a spectral analysis of the measurement data, a distortion of the measurement signal spectrum arises because of the amplitude variation. It is evident that in one advantageous embodiment, the amplitude variation 901 should be reversed in a first step 1301 of the digital signal processing. For this purpose, the detected measurement signal 501 is initially multiplied by the inverse curve 1302 of the transmission characteristic 901. The resulting measurement signal 1303, 501 again corresponds, system-theoretically, to the ideal signal which, for spectral analysis, is first weighted using a window function 502 and then finally converted into an echo curve according to known methods (FFT, IFFT). It should be noted at this point that the controller unit 112, 317 can apply the inverse function 1302 automatically since the information regarding the transmitted transmission level is also managed by the controller unit. It should additionally be noted that the weighting with the functions 1302, 502 can also be consolidated into a single calculation step.

Figure 14:
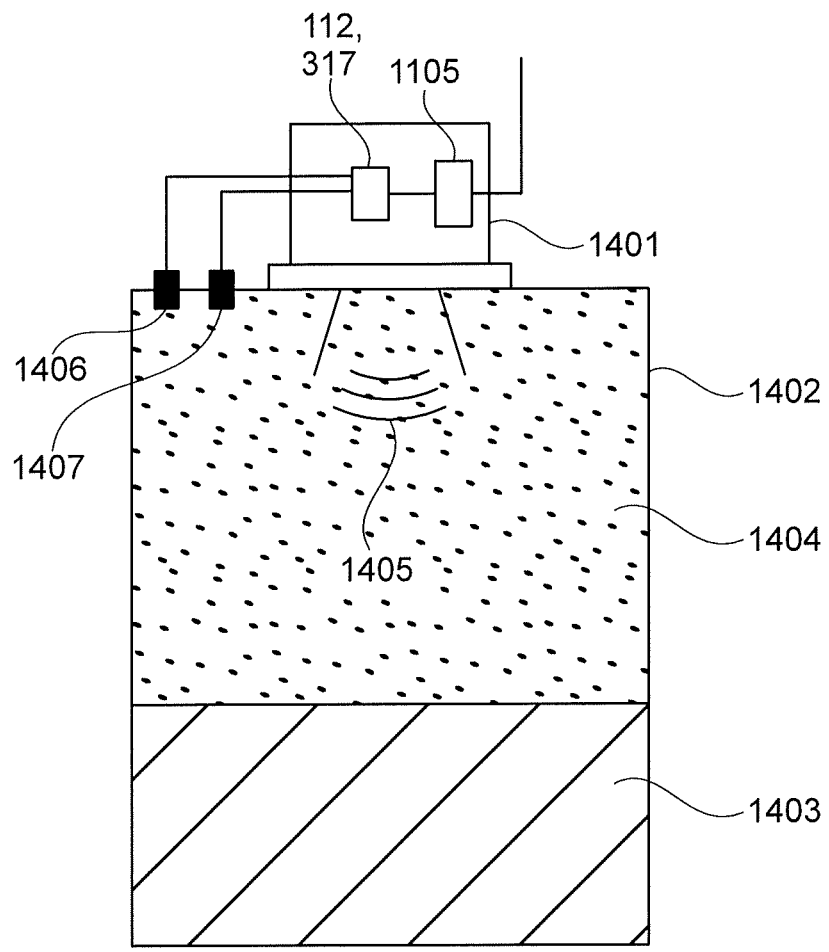
FIG. 14 shows a fill level measurement device on a container according to one embodiment.

FIG. 14 shows a fill level radar device 1401 on a container 1402. The liquid 1403 to be measured in the container forms a saturated gas atmosphere 1404 which influences the attenuation of the microwaves 1405 depending on the pressure and the temperature of the gas atmosphere 1404. The measurement device 1401 is capable of detecting the pressure and the temperature inside the container 1402, for example by means of internal sensors or by means of connection to external sensors 1406, 1407. On the basis of these values, the measurement device can determine the signal attenuation 601 of the microwaves fully automatically and can optimise the measurement of the emitted transmission power 802 fully automatically. In this case, the measurement device takes account of user specifications regarding the type of medium in the container. It can also be provided that the sensor analyses user specifications regarding the application, for example information that specifies whether a measurement will take place inside or outside a container. In this case it is also possible to fully automatically adapt to the appropriate, legally varying specifications in regard to the permitted transmission power, depending on the application.

The measurement device is also configured, on the basis of user specifications, to ascertain the country in which the container 1402 is located, and to adjust the optimised curve of the power transmission level 701, 702 for the particular country of operation. In an alternative embodiment, the measurement device 1401 comprises an automatic position-detection means 1402, for example a GPS receiver. On the basis of the data from the position detection means 1402, the measurement device can automatically ascertain the installation site and from this, in turn, automatically optimise the curve of the power transmission over the frequency in accordance with the applicable regulations in the particular country.

It should be noted in general that the block diagrams and the principle drawings are reduced to the essential components and that some of the components required for the practical implementation have not been shown or have been simplified, since these components are known to a person skilled in the art. This relates for example to filtering measures at the output of the mixer for allowing only the desired mix frequencies to pass and suppressing undesired mix products. It is also routine for a person skilled in the art to amplify signals where necessary at various points in the signal chain in order to increase the signal-to-noise ratio. This could be achieved for example by amplifiers in the transmission branch or in the reception branch. Furthermore, only the part of the sensor circuit that is significant for direct measurement technology has been shown here. It goes without saying that a fill level radar sensor constructed according to this principle can contain further circuit parts.

Figure 15:
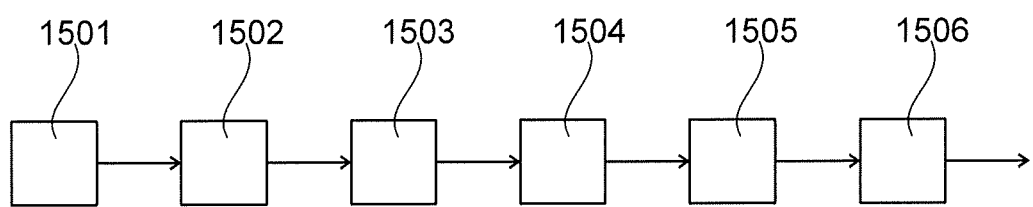
FIG. 15 is a flow chart of a method according to one embodiment.

FIG. 15 is a flow chart of a method according to one embodiment. Generating an electromagnetic transmission signal of which the duration is greater than double the delay time of the transmission signal from the signal source to the filling material, begins in step 1501. The transmission signal is a continuous or stepped signal having a frequency that differs at least in portions. In step 1502, the emission of the transmission signal towards the filling material surface begins. In step 1503, the power of the transmission signal is altered, i.e. on the basis of its current frequency. The change in power corresponds to a predefinable correlation between frequency and power. Said correlation can be changed by the measurement device in step 1504, for example because the conditions in the container have changed. The emitted transmission signal is reflected by the filling material surface in step 1505, and is received and processed by the fill level measurement device in step 1506.

For the sake of completeness, it should be noted that "comprising" and "having" do not exclude the possibility of other elements or steps, and the indefinite article "a" or "an" does not exclude the possibility of a plurality. It should further be pointed out that features or steps described with reference to one of the above embodiments may also be used in combination with other features or steps of other above-described embodiments. Reference signs in the claims should not be treated as limiting.

The invention claimed is:
1. A fill level radar device, comprising:
a signal source arrangement configured to generate an electromagnetic transmission signal, the electromagnetic transmission signal having a duration, within a measurement cycle, that is longer than double a run time of the transmission signal from a signal source arrangement to a filling material, wherein a frequency of the transmission signal is swept during a measurement cycle; and transmission-power adjustment circuitry configured to adjust a power of the transmission signal depending on a frequency of the transmission signal in accordance with a predefined correlation between frequency and power.

2. The fill level radar device according to claim 1, wherein the predefined correlation is dependent on a temperature of the filling material, a temperature in a container, a pressure in the container, a composition of the filling material and/or radiation attenuation properties of a container atmosphere.

3. The fill level radar device according to claim 2, wherein the predefined correlation is dependent on an installation location of the fill level radar device.

4. The fill level radar device according to claim 2, further comprising:
an analysis circuit configured to determine a fill level using the predefined correlation.

5. The fill level radar device according to claim 2, further comprising:
a control circuit configured to change the predefined correlation during an operational phase of the fill level radar device.

6. The fill level radar device according to claim 2, wherein the control circuit is configured to determine the predefined correlation using parameters that are input by a user or using detected parameters.

7. The fill level radar device according to claim 2, further comprising:
a position sensor configured to determine an installation location of the fill level radar device.

8. The fill level radar device according to claim 2, further comprising:
a transceiver circuit configured to:
emit the transmission signal towards a filling material surface;
receive the transmission signal reflected by the filling material surface and mix the received reflected transmission signal with a further signal in order to form a reflection-dependent reception signal from which a fill level can be determined.

9. The fill level radar device according to claim 2, wherein the transmission signal comprises a frequency that is constant in portions, and
wherein individual frequencies are distributed within a defined frequency band.

10. The fill level radar device according to claim 1, wherein the predefined correlation is dependent on an installation location of the fill level radar device.

11. The fill level radar device according to claim 1, further comprising:
an analysis circuit configured to determine a fill level using the predefined correlation.

12. The fill level radar device according to claim 1, further comprising:
a control circuit configured to change the predefined correlation during an operational phase of the fill level radar device.

13. The fill level radar device according to claim 1, wherein the control circuit is configured to determine the predefined correlation using parameters that are input by a user or using detected parameters.

14. The fill level radar device according to claim 1, further comprising:
a position sensor configured to determine an installation location of the fill level radar device.

15. The fill level radar device according to claim 1, further comprising:
a transceiver circuit configured to:
emit the transmission signal towards a filling material surface;
receive the transmission signal reflected by the filling material surface and mix the received reflected transmission signal with a further signal in order to form a reflection-dependent reception signal from which a fill level can be determined.

16. The fill level radar device according to claim 1, wherein the transmission signal comprises a frequency that is constant in portions, and
wherein individual frequencies are distributed within a defined frequency band.

17. A method for determining a fill level implemented on a fill level radar device, comprising:
generating an electromagnetic transmission signal, the electromagnetic transmission signal having a duration, within a measurement cycle, that is longer than double a run time of the transmission signal from a signal source to a filling material, wherein a frequency of the transmission signal is swept during a measurement cycle; and
adjusting a power of the transmission signal depending on the frequency of the transmission signal in accordance with a predefined correlation between frequency and power.

18. A non-transitory computer-readable medium storing a program element that when executed by a processor causes the processor to be configured to implement a method for determining a fill level, comprising:
generating an electromagnetic transmission signal, the electromagnetic transmission signal having a duration, within a measurement cycle, that is longer than double a run time of the transmission signal from a signal source to a filling material, wherein a frequency of the transmission signal is swept during a measurement cycle; and
adjusting a power of the transmission signal depending on the frequency of the transmission signal in accordance with a predefined correlation between frequency and power.

* * * * *